(No Model.)
H. WEITZEL.
BROOM MOISTENER.
No. 417,349. Patented Dec. 17, 1889.
Fig. 1.
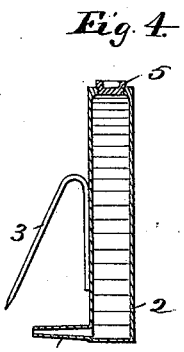
Fig. 4.
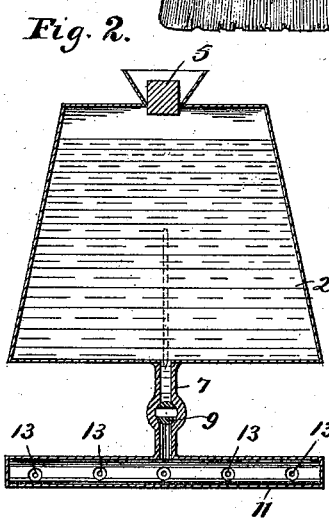
Fig. 2.
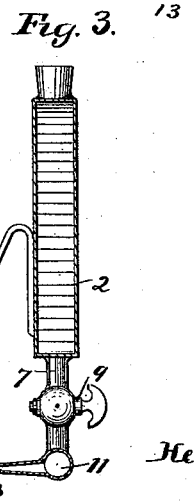
Fig. 3.
Witnesses
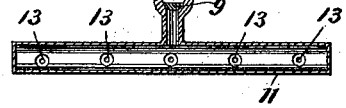
Inventor.
Henry Weitzel.
By Paul & Merwin atty.
N. PETERS, Photo-Lithographer, Washington, D. C.

UNITED STATES PATENT OFFICE.

HENRY WEITZEL, OF MINNEAPOLIS, MINNESOTA.

BROOM-MOISTENER.

SPECIFICATION forming part of Letters Patent No. 417,349, dated December 17, 1889.

Application filed March 23, 1889. Serial No. 304,534. (No model.)

*To all whom it may concern:*

Be it known that I, HENRY WEITZEL, of Minneapolis, in the county of Hennepin and State of Minnesota, have invented certain Improvements in Broom-Moisteners, of which the following is a specification.

The object of this invention is to provide an improved device which can be applied to an ordinary corn-broom for the purpose of moistening the broom and thereby preventing the raising of dust while sweeping.

In the accompanying drawings, forming part of this specification, Figure 1 is a side elevation of a broom with my device applied thereto. Fig. 2 is a vertical section of the device. Fig. 3 is a section at right angles to the plane of Fig. 2. Fig. 4 is a view similar to Fig. 3, showing a modification.

In the drawings, 2 represents a suitable receptacle, which is preferably formed of sheet metal and is flat-sided, so as to be adapted to fit closely against the side of the broom. It is provided on one side with a laterally-projecting hook 3, which is adapted to be forced into the broom and thereby to secure the receptacle to the side of the broom, as shown in Fig. 1. The receptacle is also provided with a filling-opening, which may be closed by a suitable plug 5. At the bottom of the receptacle is a pipe 7, provided with a stop-cock 9. The pipe 7 connects with a cross-pipe 11. The pipe 11 is provided with a series of laterally-projecting nozzles 13, which, when the device is in place on the broom, project into the interior thereof.

In Fig. 4 I have shown the nozzles 13 connected directly to the receptacle 2. The receptacle being filled with water and being secured to the broom, with the nozzles projecting into the interior thereof, the water passes through the nozzles to the interior of the broom and then passes down through the interior of the broom to the bottom. The bottom of the broom is thus kept moist and no dust will be raised in using the broom.

I claim as my invention—

1. The herein-described broom-moistener, consisting of the receptacle 2, provided with a filling-orifice and with the laterally-projecting hook 3, and the series of laterally-projecting nozzles 13, substantially as described.

2. The herein-described broom-moistener, comprising the receptacle 2, with the hook 3, the pipe 7, having the stop-cock 9, the cross-pipe 11, and the series of laterally-projecting nozzles 13, all substantially as described.

In testimony whereof I have hereunto set my hand this 7th day of January, 1889.

HENRY WEITZEL.

In presence of—
A. C. PAUL,
A. M. GASKILL.